(12) United States Patent
Kyle et al.

(10) Patent No.: US 11,900,495 B2
(45) Date of Patent: Feb. 13, 2024

(54) CONTROL APPARATUS, VEHICLE, NON-TRANSITORY COMPUTER READABLE MEDIUM, AND CONTROL METHOD

(71) Applicant: TOYOTA JIDOSHA KABUSHIKI KAISHA, Toyota (JP)

(72) Inventors: Roger Kyle, Nagoya (JP); Yuta Kodama, Toyota (JP); Corentin Marie C. Mossoux, Toyota (JP); Shunsuke Tanimori, Nagoya (JP); Rio Minagawa, Nagoya (JP); Dany Benjamin, Rowlett, TX (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 17/391,582

(22) Filed: Aug. 2, 2021

(65) Prior Publication Data

US 2022/0038844 A1 Feb. 3, 2022

(30) Foreign Application Priority Data

Aug. 3, 2020 (JP) .................................. 2020-132029

(51) Int. Cl.
| | | |
|---|---|---|
| *H04W 64/00* | (2009.01) | |
| *G06Q 50/30* | (2012.01) | |
| *H04W 4/021* | (2018.01) | |
| *B60Q 1/50* | (2006.01) | |
| *G06Q 10/0631* | (2023.01) | |

(52) U.S. Cl.
CPC ............... *G06Q 50/30* (2013.01); *B60Q 1/50* (2013.01); *H04W 4/021* (2013.01); *B60Q 2400/40* (2013.01); *B60Q 2400/50* (2013.01); *G06Q 10/06315* (2013.01); *G06Q 2240/00* (2013.01)

(58) Field of Classification Search
CPC ............. G06Q 50/30; G06Q 10/06315; G06Q 2240/00; B60Q 1/50; B60Q 2400/40; B60Q 2400/50; H04W 4/021; H04W 4/44
USPC ....................................................... 455/456.1
See application file for complete search history.

(56) References Cited

U.S. PATENT DOCUMENTS

| | | | |
|---|---|---|---|
| 2017/0210282 A1* | 7/2017 | Rodriguez Barros | . B60Q 1/324 |
| 2019/0166473 A1* | 5/2019 | Venkatraman | ........ H04W 4/029 |
| 2020/0175866 A1 | 6/2020 | Yamashita et al. | |
| 2021/0021295 A1* | 1/2021 | Yun | ........................ H04B 1/401 |

FOREIGN PATENT DOCUMENTS

| | | |
|---|---|---|
| EP | 3235684 A1 | 10/2017 |
| JP | 2015132707 A | 7/2015 |
| JP | 2017-159882 A | 9/2017 |
| JP | 2018-177044 A | 11/2018 |
| JP | 2019516201 A | 6/2019 |
| JP | 2020-091574 A | 6/2020 |
| WO | 2017156586 A1 | 9/2017 |

* cited by examiner

*Primary Examiner* — Tanmay K Shah
(74) *Attorney, Agent, or Firm* — Dinsmore & Shohl LLP (57) ABSTRACT

A control apparatus for controlling a vehicle, the control apparatus including a controller. The controller is configured to: when the controller determines that boarding or alighting by a user or loading or unloading of luggage is to be performed with respect to the vehicle, control the vehicle to project visual information to, or set a geo-fence on, at least a part of a region within a predetermined range from the vehicle.

17 Claims, 9 Drawing Sheets

| USER ID | BOARDING POINT | BOARDING TIME | COMPANION | LUGGAGE SIZE |
|---|---|---|---|---|
| U01 | POINT A | APRIL 1 AT 9:00 | CHILD | null |
| U02 | POINT B | APRIL 2 AT 15:00 | null | LARGE |
| ⋮ | ⋮ | ⋮ | ⋮ | ⋮ |

| USER ID | BOARDING POINT | BOARDING TIME | COMPANION | LUGGAGE SIZE |
|---------|----------------|---------------|-----------|--------------|
| U01 | POINT A | APRIL 1 AT 9:00 | CHILD | null |
| U02 | POINT B | APRIL 2 AT 15:00 | null | LARGE |
| ... | ... | ... | ... | ... |

CONTROL APPARATUS, VEHICLE, NON-TRANSITORY COMPUTER READABLE MEDIUM, AND CONTROL METHOD

CROSS-REFERENCE TO RELATED APPLICATION

This application claims priority to Japanese patent application 2020-132029 filed on Aug. 3, 2020, the entire disclosure of which is incorporated herein by reference.

TECHNICAL FIELD

The present disclosure relates to a control apparatus, a vehicle, a program, and a control method.

BACKGROUND

A technique that forms a projection image on a road surface to notify surrounding vehicles of information, such as the traveling direction of a vehicle, is known (for example, Patent Literature [PTL] 1).

CITATION LIST

Patent Literature

PTL 1: JP 2015-132707 A

SUMMARY

For specific situations such as boarding or alighting of a person or loading or unloading of luggage, notification to the surroundings is required. However, if the notification is provided regardless of the situation, it may be irritating.

It would be helpful to provide a control apparatus, a vehicle, a program, and a control method which enable providing a notification to the surroundings of a vehicle only for one or more specific situations.

A control apparatus according to an embodiment of the present disclosure controls a vehicle, the control apparatus including a controller configured to:

when the controller determines that boarding or alighting by a user or loading or unloading of luggage is to be performed with respect to the vehicle, control the vehicle to project visual information to, or set a geo-fence on, at least a part of a region within a predetermined range from the vehicle.

A program according to an embodiment of the present disclosure is configured to cause a computer, as a control apparatus for controlling a vehicle, to execute operations, the operations including:

upon determining that boarding or alighting by a user or loading or unloading of luggage is to be performed with respect to the vehicle, control the vehicle to project visual information to, or set a geo-fence on, at least a part of a region within a predetermined range from the vehicle.

A control method according to an embodiment of the present disclosure is performed by a control apparatus for controlling a vehicle. The control method includes:

upon determining that boarding or alighting by a user or loading or unloading of luggage is to be performed with respect to the vehicle, control the vehicle to project visual information to, or set a geo-fence on, at least a part of a region within a predetermined range from the vehicle.

The control device, the vehicle, the program, and the control method according to embodiments of the present disclosure enable providing a notification to the surroundings of a vehicle only for one or more specific situations.

DETAILED DESCRIPTION

Figure 1:
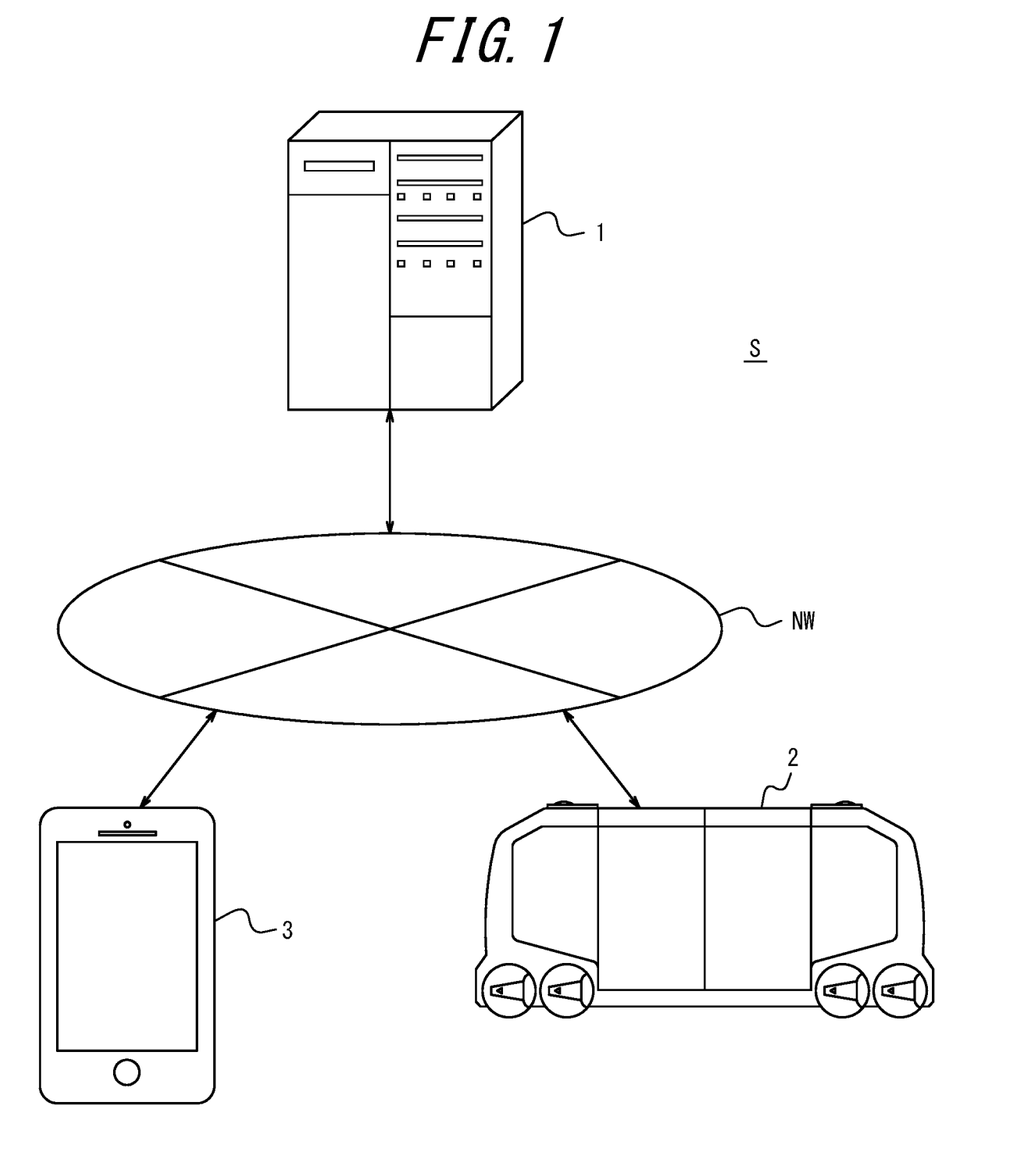
FIG. 1 is a schematic diagram of an information processing system.

FIG. 1 is a schematic diagram of an information processing system S according to an embodiment. The information processing system S includes a control apparatus 1, a vehicle 2, and a user terminal 3, which are communicably connected to each other. FIG. 1 illustrates one of each of the control apparatus 1, the vehicle 2, and the user terminal 3, for convenience of explanation. However, the number of control apparatuses 1, the number of vehicles 2, and the number of user terminals 3 are not limited to one. The control apparatus 1, the vehicle 2, and user terminal 3 are connected, for example, via a network NW which includes a mobile communication network and the Internet.

The control apparatus 1 may be a server that assists provision of a vehicle dispatch service by a provider. The control apparatus 1 may be, for example, installed in a facility dedicated to the vehicle dispatch provider or in a shared facility that includes a data center. As an alternative example, the control apparatus 1 may be mounted in the vehicle 2.

The vehicle 2 is controlled by the control apparatus 1. The vehicle 2 includes, for example, any type of automobile such as a gasoline vehicle, a diesel vehicle, an HV, a PHV, an EV, or an FCV. The term "HV" is an abbreviation of Hybrid Vehicle. The term "PHV" is an abbreviation of Plug-in Hybrid Vehicle. The term "EV" is an abbreviation of Electric Vehicle. The term "FCV" is an abbreviation of Fuel Cell Vehicle. Although the driving of the vehicle 2 is automated at any level in the present embodiment, the vehicle 2 may be driven by a driver in another embodiment. The automation level is, for example, any one of Level 1 to Level 5 according to the level classification defined by SAE. The name "SAE" is an abbreviation of Society of Automotive Engineers. The vehicle 2 may be a MaaS-dedicated vehicle. The term "MaaS" is an abbreviation of Mobility as a Service.

The user terminal 3 is a terminal in the possession of a user. The user terminal 3 may be, for example, a mobile device including a mobile phone, a smartphone, or a tablet, or may be a PC. The term "PC" is an abbreviation of Personal Computer.

An outline of processing that is executed by the control apparatus 1 according to the present embodiment will be described. The control apparatus 1 controls the vehicle 2. Upon determining that boarding or alighting by a user or loading or unloading of luggage is to be performed with respect to the vehicle 2, the control apparatus 1 controls the vehicle 2 to project visual information to, or set a geo-fence on, at least a part of a region within a predetermined range from the vehicle 2. The above configuration allows the control apparatus 1 to provide a notification using visual information or a geo-fence only for specific situations; that is, when a user is boarding or alighting or when luggage is being loaded or unloaded. Thus, the control apparatus 1 can reduce irritating notifications. In addition, the control apparatus 1 may use visual information or a geo-fence to provide necessary information to surrounding pedestrians or surrounding vehicles, or the like.

Figure 2:
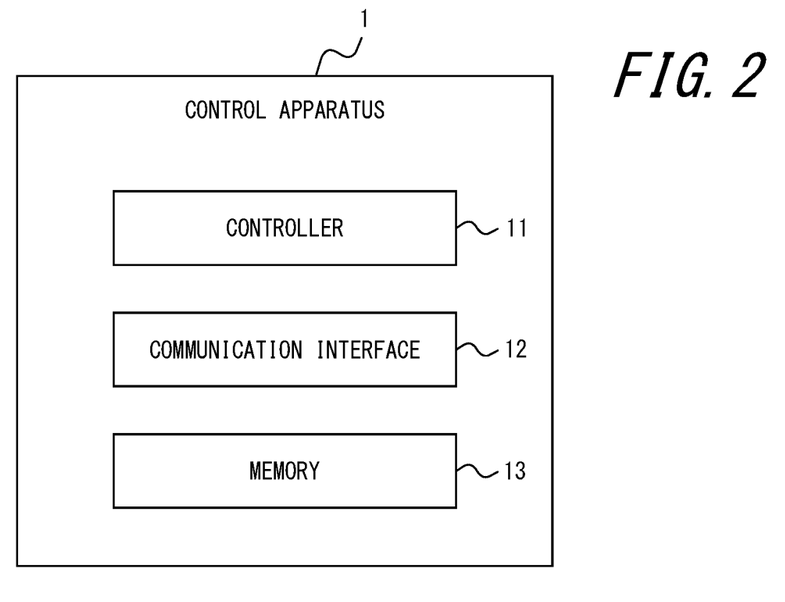
FIG. 2 is a block diagram illustrating a configuration of a control apparatus.

With reference to FIG. 2, an internal configuration of the control apparatus 1 will be described in detail.

The control apparatus 1 includes a controller 11, a communication interface 12, and a memory 13. The components of the control apparatus 1 are communicably connected to one another via, for example, a dedicated line.

The controller 11 includes, for example, one or more general-purpose processors including a Central Processing Unit (CPU) or a Micro Processing Unit (MPU). The controller 11 may include one or more dedicated processors that are dedicated to specific processing. The controller 11 may include one or more dedicated circuits instead of the processor. Examples of dedicated circuits may include a Field-Programmable Gate Array (FPGA) and an Application Specific Integrated Circuit (ASIC).

The communication interface 12 includes, for connecting to the network NW, one or more communication modules that conform to wired or wireless Local Area Network (LAN) standards. The communication interface 12 may include one or more modules conforming to mobile communication standards including the 4th Generation (4G) standard or the 5th Generation (5G) standard. The communication interface 12 may include one or more communication modules conforming to near field communication standards or specifications, including Bluetooth (Bluetooth is a registered trademark in Japan, other countries, or both), AirDrop (AirDrop is a registered trademark in Japan, other countries, or both), IrDA, ZigBee (ZigBee is a registered trademark in Japan, other countries, or both), Felica (Felica is a registered trademark in Japan, other countries, or both), or RFID. The communication interface 12 is configured to transmit and receive any appropriate information via the network NW. The any appropriate information includes, for example, positional information acquired through the Global Positioning System (GPS).

The memory 13 may be, but is not limited to, a semiconductor memory, a magnetic memory, or an optical memory. The memory 13 may function as, for example, a main memory, an auxiliary memory, or a cache memory. The memory 13 may store information resulting from analysis or processing performed by the controller 11. The memory 13 may store various types of information regarding operation and control of the control apparatus 1. The memory 13 may include a system program, an application program, embedded software, and the like. The memory 13 of the present embodiment includes a boarding information DB described later. As an alternative example, the boarding information DB may be stored in a storage device external to the control apparatus 1.

Figure 3:
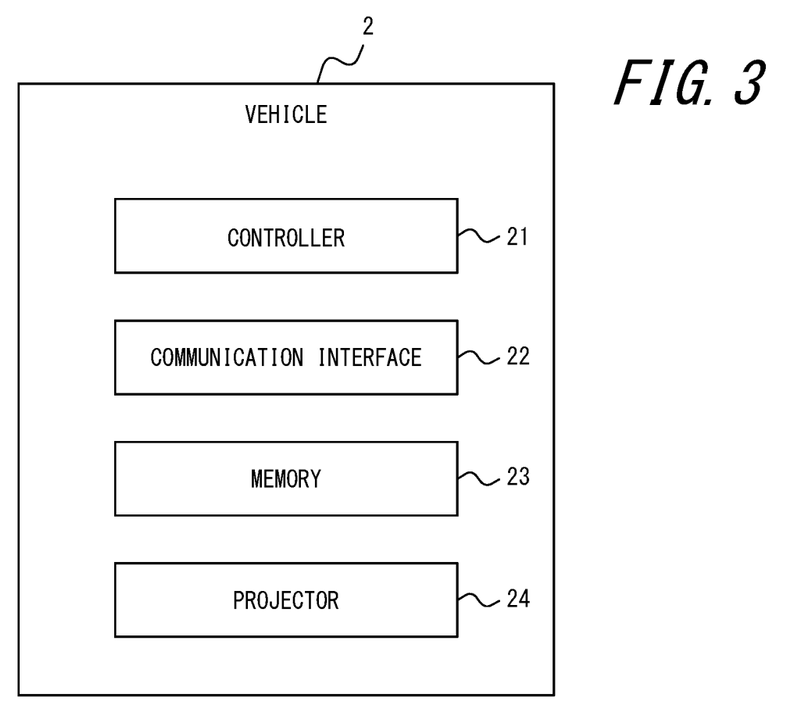
FIG. 3 is a block diagram illustrating a configuration of a vehicle.

With reference to FIG. 3, an internal configuration of the vehicle 2 will be described in detail.

The vehicle 2 includes a controller 21, a communication interface 22, a memory 23, and a projector 24. The components of the vehicle 2 are communicably connected to one another via, for example, a dedicated line. In the present embodiment, hardware components of the controller 21, the communication interface 22, and the memory 23 are the same as the hardware components of the controller 11, the communication interface 12, and the memory 13 of the control apparatus 1. Therefore, a description thereof is omitted here.

The projector 24 is a device configured to emit a laser or visible light or the like to project an image. The projector 24 may be provided on any side of the vehicle 2. The projector 24 may emit a laser or visible light through a hologram that is a photosensitive medium to project any visual information to at least a part of a region within a predetermined range from the vehicle 2. The visual information may include at least one of identification information for the vehicle 2, identification information for a user who boards or alights from the vehicle 2, and information indicating that boarding or alighting by the user or loading or unloading of luggage is performed. The region within a predetermined range from the vehicle 2 may be a region in an upward direction, a front direction, a side direction, or a rear direction from the vehicle 2. The region within a predetermined range from the vehicle 2 may be in the air or on a road surface. The hologram may be an embossed hologram or a volume hologram. The embossed hologram may be a rainbow hologram. The volume hologram may be a transmissive hologram or a reflective hologram.

Figure 4:
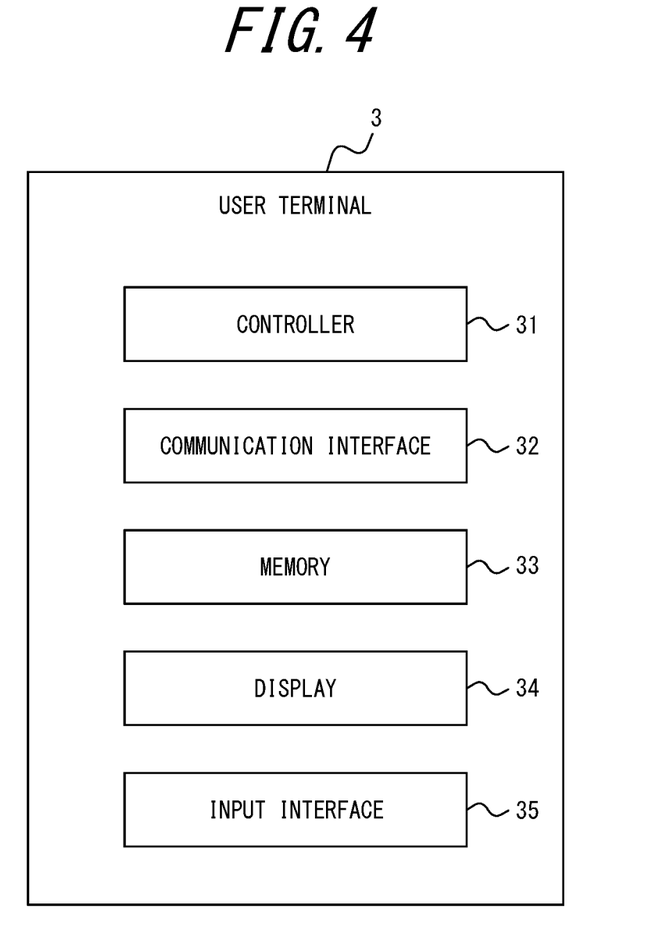
FIG. 4 is a block diagram illustrating a configuration of a user terminal.

With reference to FIG. 4, an internal configuration of the user terminal 3 will be described in detail.

The user terminal 3 includes a controller 31, a communication interface 32, a memory 33, a display 34, and an input interface 35. The components of the user terminal 3 are communicably connected to one another, for example, via a dedicated line. In the present embodiment, hardware configuration of the controller 31, the communication interface 32, and the memory 33 are the same as the hardware components of the controller 21, the communication interface 22, and the memory of the vehicle 2. Therefore, a description thereof is omitted here.

The display 34 is a display interface and includes, for example, a panel display. The display 34 may display information read from the memory 33, or information generated by the controller 31.

The input interface 35 includes one or more input interfaces that detect a user input and send input information to the controller 31. Examples of input interfaces may include, but are not limited to, a physical key, a capacitive key, a touch screen integrally provided in the panel display, a microphone configured to receive audio input, and an IC card reader.

Hereinafter, processing executed in the information processing system S according to the present embodiment will be described in detail. Here, as an example, the situation in which the user of the user terminal 3 requests vehicle dispatch is explained. The vehicle 2 to be dispatched may be, for example, a taxi for ride sharing. The user is associated with a user identifier, U01.

The user U01 enters boarding information through the input interface 35 of the user terminal 3. The boarding information includes information for a boarding point, information for boarding time, information for a companion, and information for a luggage size. The boarding point is a point at which the user U01 boards the vehicle 2. The boarding time is time when the user U01 boards the vehicle 2. The companion is a person who boards the vehicle 2 with the user U01. Information for the companion is attribute information for the user U01. The luggage size is the size of luggage held by the user U01. Information for the luggage size can be selected from, for example, "small", "medium" or "large". Information for the luggage size is attribute information for the luggage. Additionally or alternatively, other information may be included in the attribute information for the user U01 or the attribute information for the luggage.

Figure 5:
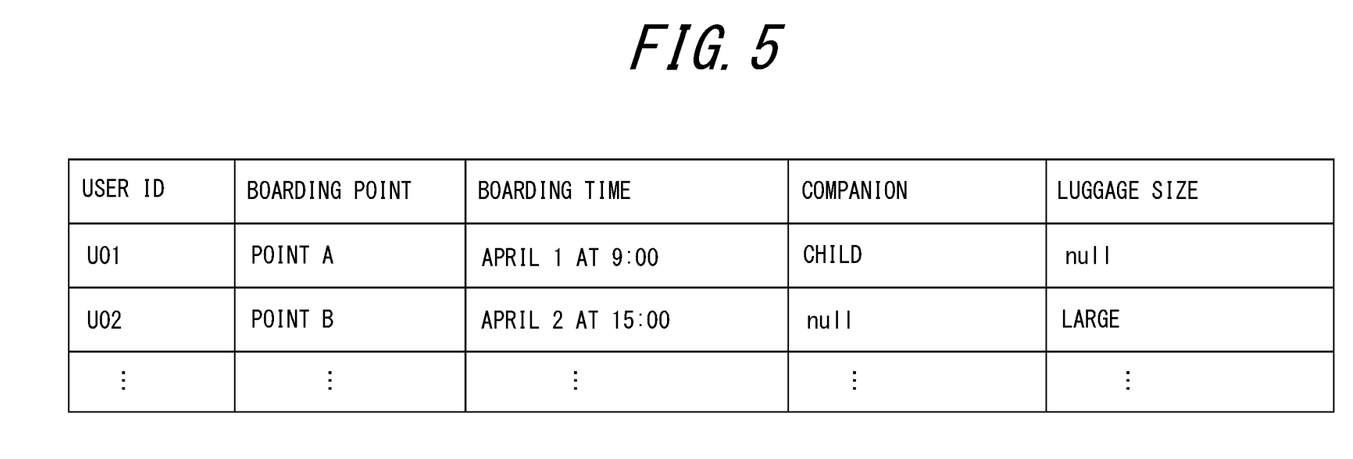
FIG. 5 is a diagram illustrating a data structure of a boarding information DB (database)

Upon receiving input of boarding information, the user terminal 3 transmits a vehicle dispatch request including the boarding information to the control apparatus 1. Upon acquiring the boarding information, the controller 11 of the control apparatus 1, as illustrated in FIG. 5, stores the boarding information in the boarding information DB of the memory 13 in association with "U01" as is a user ID.

The controller 11 of the control apparatus 1 refers to the boarding information stored in the memory 13 to dispatch the vehicle 2 to a specified boarding point at a specified boarding time.

Figure 6:
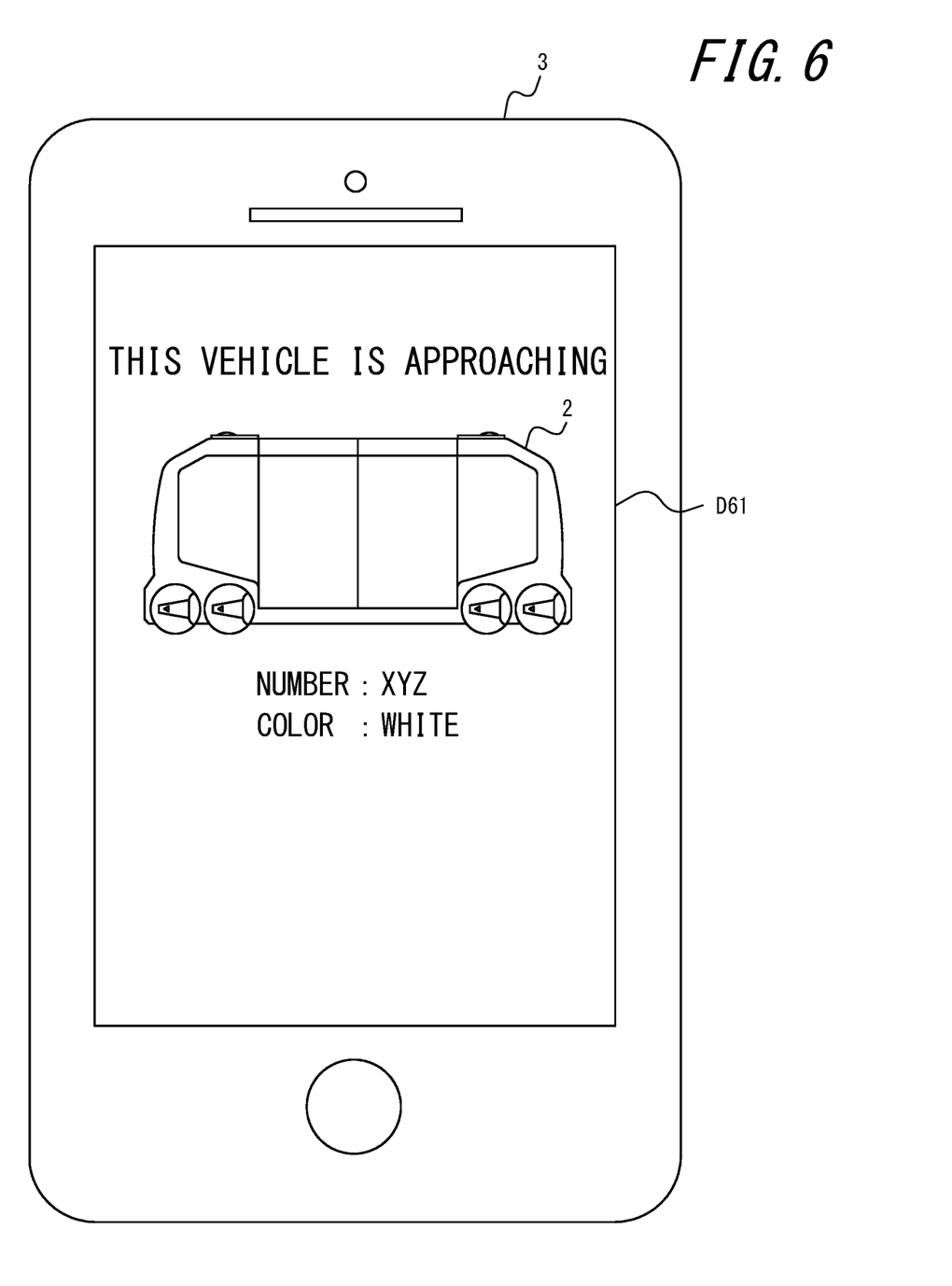
FIG. 6 is a diagram illustrating a screen displayed on the user terminal.

When the current time is a predetermined time (e.g., 10 minutes) before the boarding time, the controller 11 of the control apparatus 1 transmits information indicating that the vehicle 2 is to be dispatched and identification information for the vehicle 2 to the user terminal 3 in the possession of the user U01 who is to board the vehicle 2. Specifically, as illustrated in FIG. 6, the user terminal 3 is caused to display a screen D61 that displays that the vehicle 2 is approaching the boarding point, and information for a number and a color of the vehicle 2.

The controller 11 of the control apparatus 1 refers to the boarding information DB in the memory 13 to determine whether boarding or alighting by the user or loading or unloading of the luggage is to be performed. Here, as an example of boarding or alighting by the user U01, a case in which the user U01 boards the vehicle 2 is described.

Figure 7:
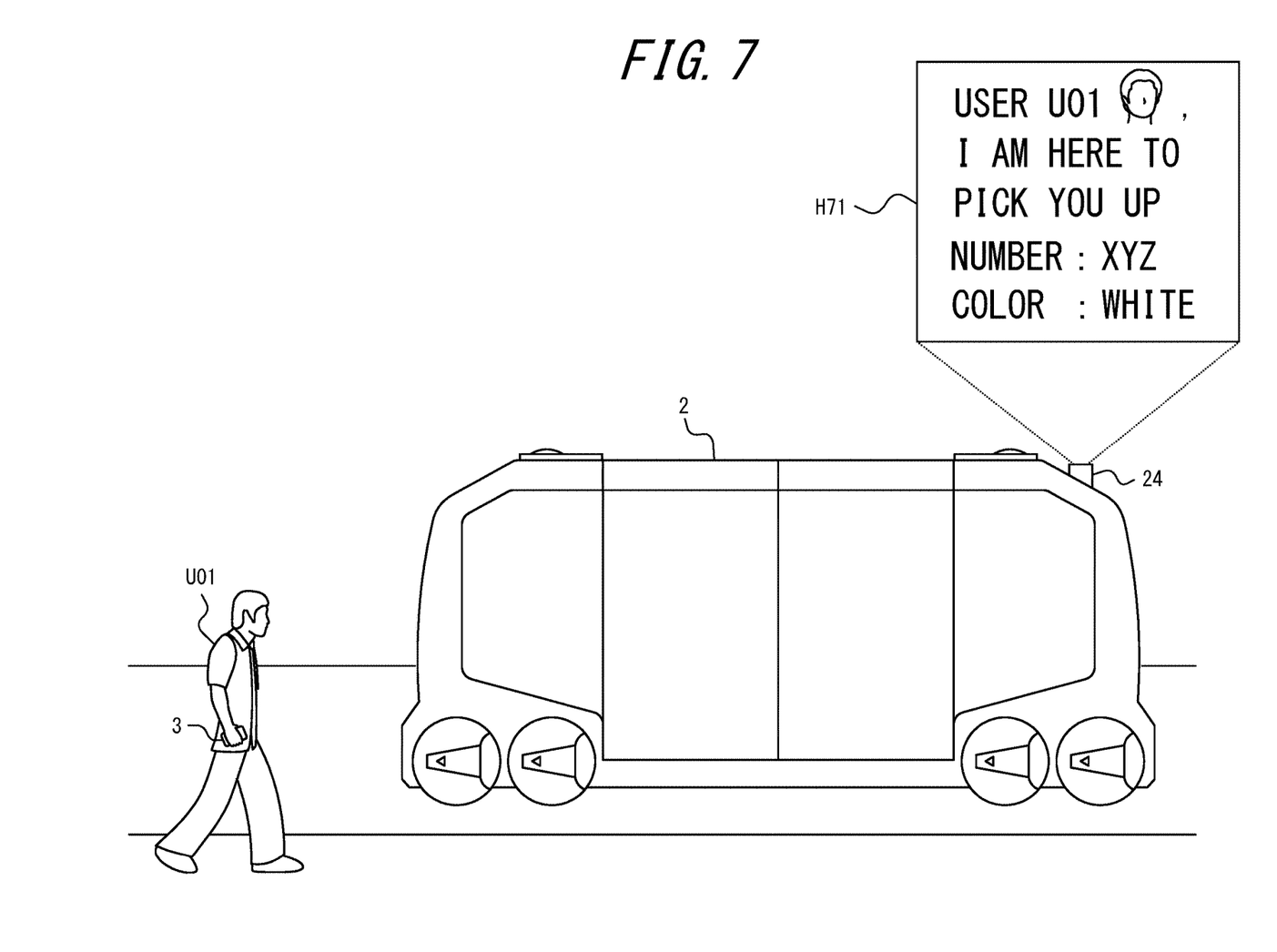
FIG. 7 is a diagram illustrating an example of visual information.

When the controller 11 of the control apparatus 1 determines that boarding or alighting by the user U01 is to be performed, the vehicle 2 may project visual information H71 above the vehicle 2 at the boarding point using the projector 24 as illustrated in FIG. 7. The visual information H71 includes identification information for the user (corresponding to "U01" and a profile image) picked up by the vehicle 2, and information for the number (corresponding to "XYZ") and the color (corresponding to "WHITE") that is identification information for the vehicle 2. The information for the number and the color included in the visual information H71 is common to the information for the number and the color transmitted to and displayed on the user terminal 3. As an alternative example, the visual information H71 may be projected on a road surface around the vehicle 2, rather than above the vehicle 2. The user U01 can compare the visual information H71 with information displayed on the screen D61 illustrated in FIG. 6 to identify the vehicle 2 which the user U01 is to board.

Figure 8:
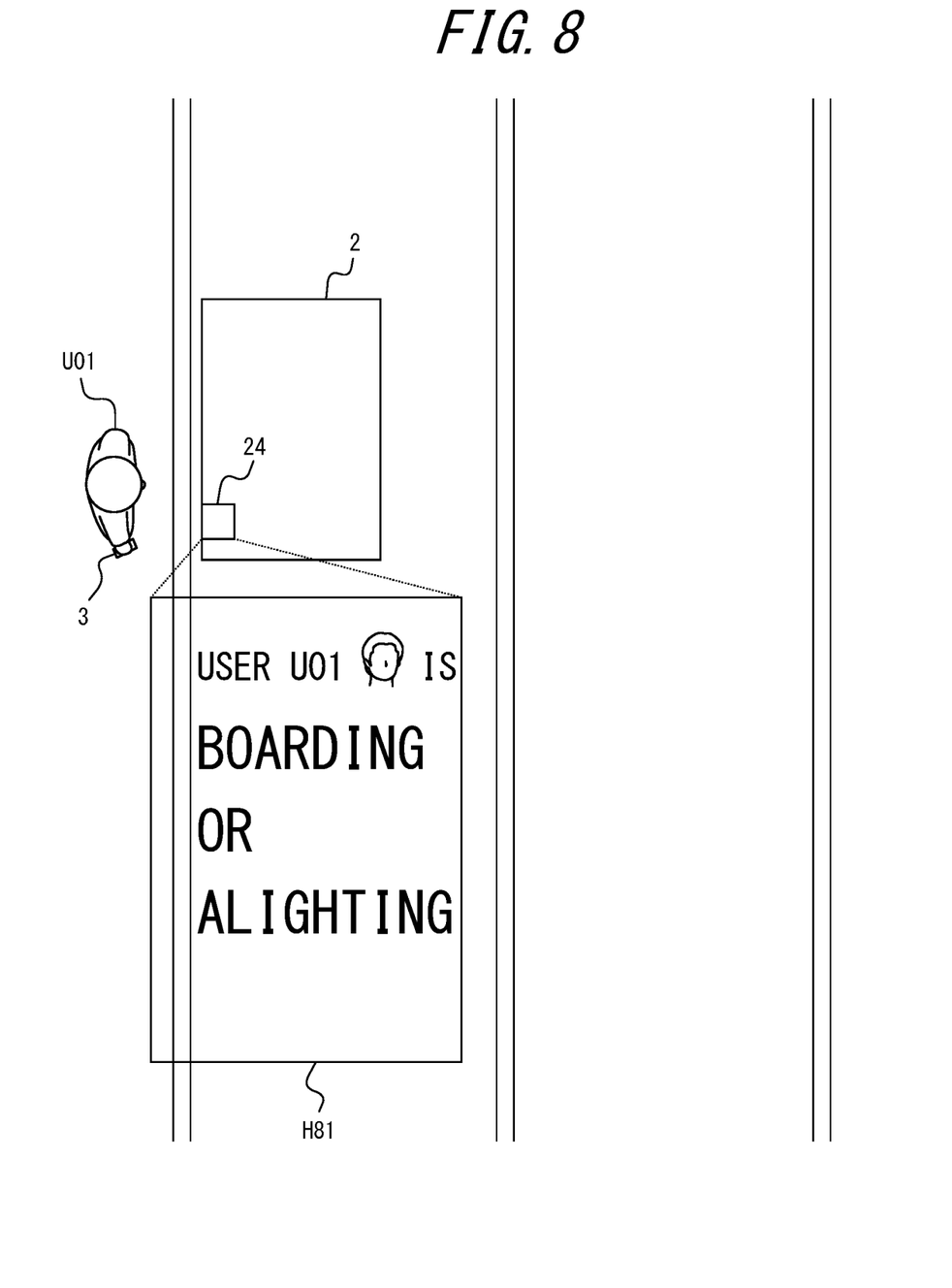
FIG. 8 is a diagram illustrating another example of the visual information.

When the controller 11 of the control apparatus 1 determines that boarding or alighting by the user U01 is to be performed, the vehicle 2 may project visual information H81 on a road surface behind the vehicle 2 as illustrated in FIG. 8. The visual information H81 includes information indicating that boarding or alighting by the user U01 will be performed. The vehicle 2 can project the visual information H81 to allow surrounding vehicles and surrounding persons to recognize that the user U01 is boarding or alighting. As an alternative example, the visual information H81 may be projected in the air behind the vehicle 2 rather than on a road surface behind the vehicle 2. As another alternative example, the visual information H81 may be projected in front of or beside the vehicle 2, rather than behind the vehicle 2.

Additionally, the vehicle 2 may adjust a display surface area of the projected visual information, in accordance with attributes of the user U01 or attributes of the luggage. The vehicle 2, for example, refers to the boarding information DB to identify a companion of the user U01. In an example illustrated in FIG. 5, the companion of the user U01 is a "CHILD". A child is likely to wander around the vehicle 2. In preparation for this case, the vehicle 2 increases the display surface area of the visual information H81. As an alternative example, when boarding or alighting by another user U02 is performed, the vehicle 2 may adjust the display surface area of the visual information in accordance with the attributes of the user U02 or the attributes of luggage. For example, the vehicle 2 refers to the boarding information DB to identify a luggage size. In an example illustrated in FIG. 5, the size of the luggage of the user U02 is "LARGE". When loading or unloading of larger luggage is performed, a wider space for loading or unloading is required compared to when loading or unloading of smaller luggage is performed. Therefore, when boarding or alighting by the user U02 is performed, the vehicle 2 may increase the display surface area of the projected visual information H81.

Figure 9:
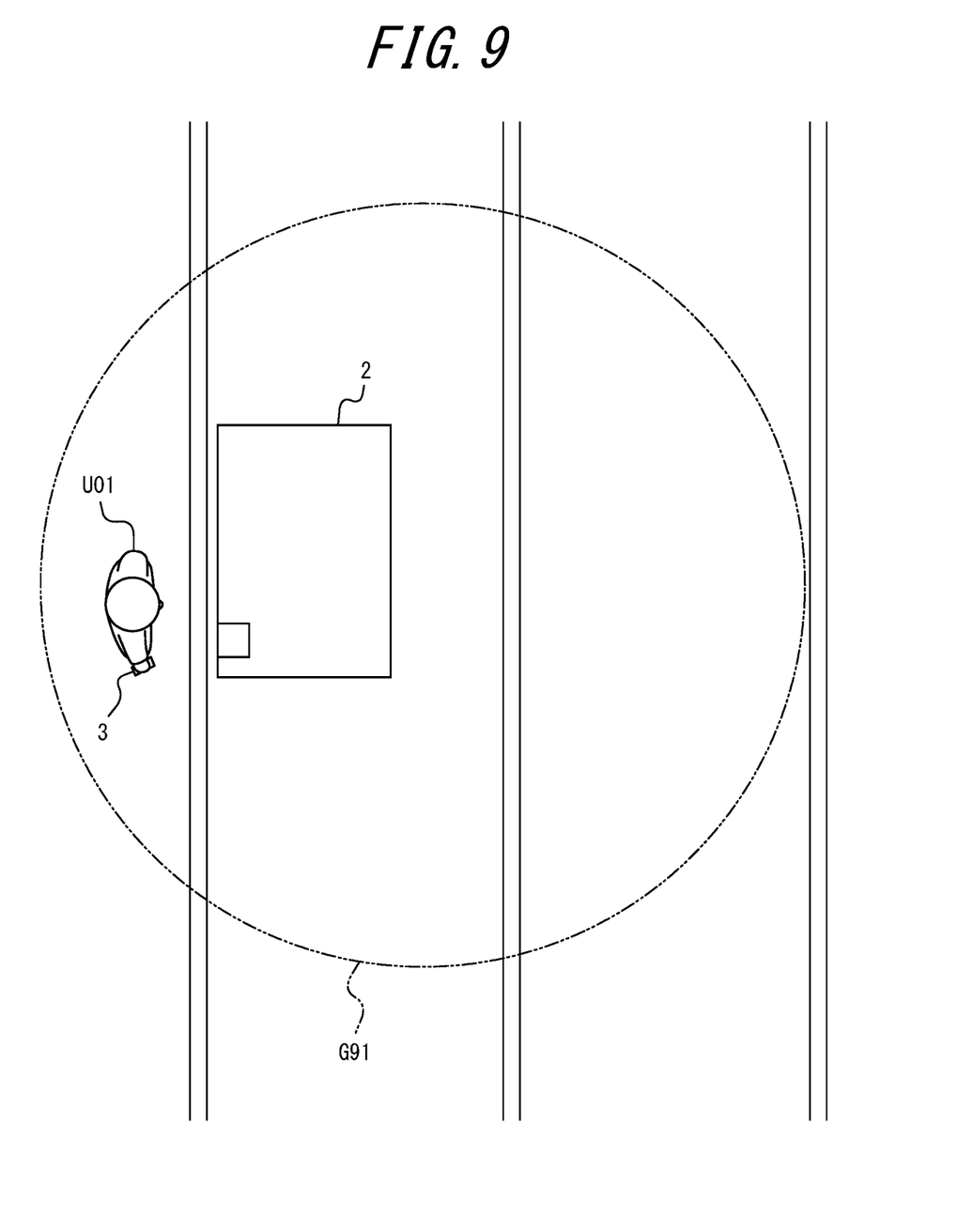
FIG. 9 is a diagram illustrating an example of a geo-fence.

Additionally or alternatively, when the controller 11 of the control apparatus 1 determines that boarding or alighting by the user U01 is to be performed, the vehicle 2 may set a geo-fence G91 as illustrated in FIG. 9. The shape of the geo-fence G91 is optional and may, for example, be a circle. The geo-fence G91 is a virtual boundary. The geo-fence G91 is not visible to human eyes. The controller 11 of the control apparatus 1 periodically or irregularly acquires positional information for any mobile device or any vehicle to determine whether any mobile device or any vehicle exists in the geo-fence G91. The controller 11 of the control apparatus 1 notifies any mobile device or any vehicle existing in the geo-fence G91 that boarding or alighting by the user U01 is performed.

The vehicle 2 may adjust a size of the set geo-fence G91 in accordance with the attributes of the user U01 or the attributes of the luggage. For example, when the companion is a "CHILD" or the luggage size is "LARGE", the vehicle 2 may enlarge the set geo-fence G91. For convenience of explanation, repetitive description is omitted here.

Upon detecting that the user U01 has boarded the vehicle 2, the vehicle 2 closes a door and departs. Upon arriving at a destination specified by the user U01, the vehicle 2 opens the door for the user U01 to alight. When the user U01 alights, the vehicle 2 may project any visual information indicating that boarding or alighting by the user U01 is performed. Additionally or alternatively, when the user U01 alights, the vehicle 2 may set any geo-fence to notify any mobile device or any vehicle existing in the geo-fence that boarding or alighting by the user U01 is performed. For convenience of explanation, repetitive description is omitted here.

In the above example, performing boarding or alighting by the user U01 is described. As an alternative, the controller 11 of the control apparatus 1 may refer to the riding information DB to identify the presence or absence of luggage and, upon determining that loading or unloading of the luggage is to be performed regardless of boarding or alighting by the user, control the vehicle 2 to project visual information to, or set a geo-fence on, at least a part of a region within a predetermined range from the vehicle 2.

Figure 10:
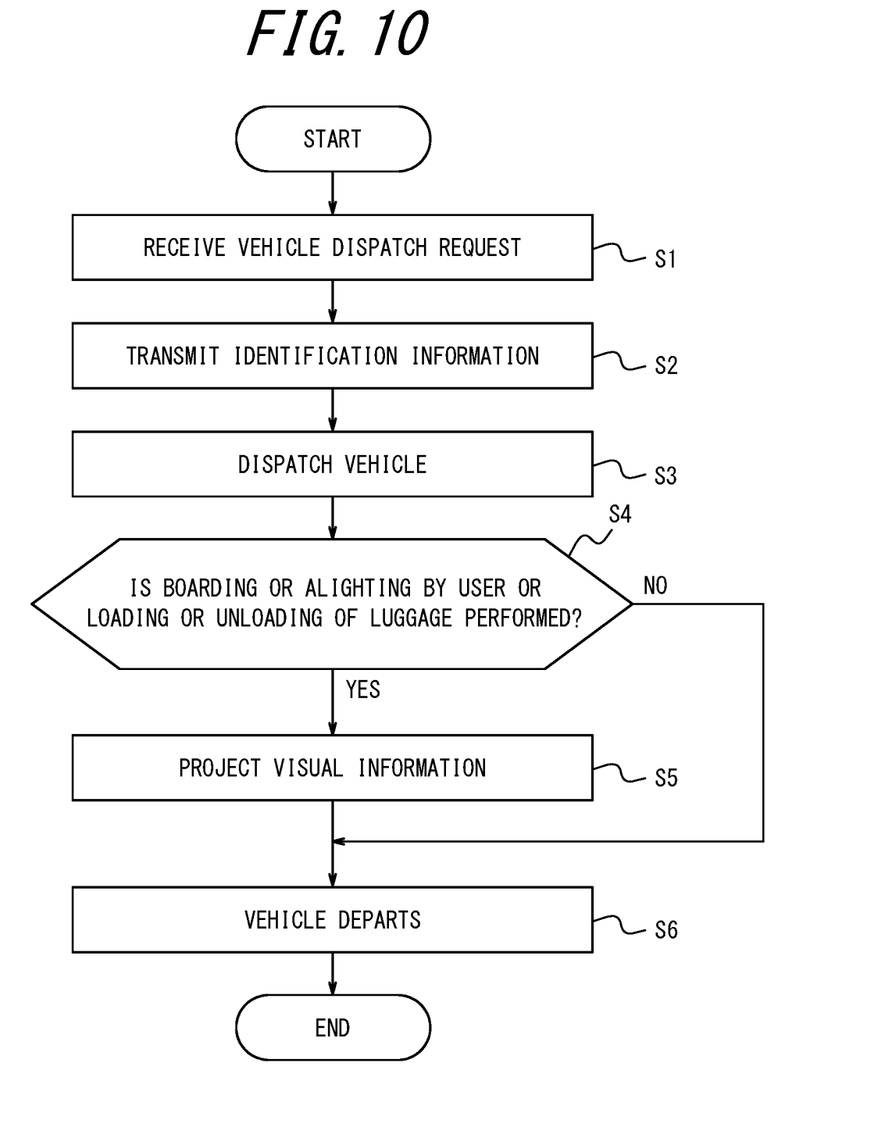
FIG. 10 is a flow chart illustrating operation of the control apparatus.

With reference to FIG. 10, a control method executed by the control apparatus 1 will be described.

In Step S1, the controller 11 of the control apparatus 1 receives, from the user terminal 3, a vehicle dispatch request including the boarding information.

In Step S2, the controller 11 of the control apparatus 1 transmits the identification information for the vehicle 2 to the user terminal 3.

In Step S3, upon referring to the boarding information, the controller 11 of the control apparatus 1 dispatches the vehicle 2 to the specified boarding point at the specified boarding time.

In Step S4, the controller 11 of the control apparatus 1 determines whether boarding or alighting of a person or loading or unloading of luggage is to be performed with respect to the vehicle 2.

If the result of the determination is "Yes" in Step S4, the controller 11 of the control apparatus 1 projects, in Step S5, visual information to at least a part of a region within a predetermined range from the vehicle 2. As an alternative example, the controller 11 of the control apparatus 1 may set a geo-fence on at least a part of the region.

If the result of the determination is "No" in Step S4, the controller 11 of the control apparatus 1 does not execute Step S5.

In Step S6, upon determining that boarding or alighting by the user or loading or unloading of the luggage is complete, the controller 11 of the control apparatus 1 causes the vehicle 2 to depart.

As has been described, according to the present embodiment, upon determining that boarding or alighting by the user or loading or unloading of the luggage is to be performed, the controller 11 of the control apparatus 1 controls the vehicle 2 to project visual information to, or set the geo-fence on, at least a part of the region within a predetermined range from the vehicle 2. According to this configuration, it is possible to provide a notification only for a specific situation using the visual information or the geofence. Therefore, the control apparatus 1 can reduce irritating notifications.

Moreover, the control apparatus 1 can provide necessary information to surrounding pedestrians or surrounding vehicles, or the like, using the visual information or the geo-fence.

Moreover, according to the present embodiment, the visual information includes at least one of identification information for the vehicle 2, identification information for a user who boards or alights from the vehicle 2, and information indicating that boarding or alighting by the user or loading or unloading of the luggage is to be performed. This configuration enables the user to distinguish the vehicle 2 which the user is to board from other vehicles. Moreover, it is easy for the user to avoid accidentally boarding another vehicle of a malicious person. This configuration is particularly useful when the other vehicle is of the same type, model or color as the vehicle 2. Thus, convenience and safety in use of the vehicle 2 is improved.

Moreover, according to the present embodiment, the controller 11 of the control apparatus 1 notifies a terminal existing within the geo-fence that boarding or alighting by the user or loading or unloading of the luggage is to be performed. This configuration enables the control apparatus 1 to transmit a notification to pedestrians or drivers of vehicles existing in the vicinity of the vehicle 2. Thus, the control apparatus 1 can reduce a minor collision or a crash, thereby improving road traffic safety.

Moreover, according to the present embodiment, the controller 11 further transmits identification information for the vehicle 2 to the user terminal 3 of a user who is scheduled to board the vehicle 2. The projected visual information and the information transmitted to the user terminal 3 include common information. This configuration enables the user to compare the identification information transmitted to the user terminal 3 with the projected visual information to confirm whether common information is included therein, thereby easily identifying the vehicle 2 which the user himself/herself is to board.

Moreover, according to the present embodiment, the controller 11 controls the vehicle 2 to adjust the display surface area of the projected visual information or a size of the set geo-fence in accordance with attributes of the user or attributes of the luggage. This configuration enables the control apparatus 1 to enlarge or reduce a range in which necessary information is provided. Therefore, the control apparatus 1 can further enhance safety.

Moreover, according to the present embodiment, the region within a predetermined range from the vehicle 2 includes a region in an upward direction, a front direction, a side direction, or a rear direction from the vehicle 2. This configuration enables the control apparatus 1 to provide information to surrounding pedestrians and surrounding vehicles existing in various locations, thereby reducing omissions in providing information.

While the present disclosure has been described with reference to the drawings and examples, it should be noted that various modifications and revisions may be implemented by those skilled in the art based on the present disclosure. Accordingly, such modifications and revisions are included within the scope of the present disclosure. For example, functions or the like included in each step can be rearranged without logical inconsistency, and a plurality of steps can be combined together or divided.

For example, in the above embodiment, a program that executes all or some of the functions or processing of the control apparatus 1 may be recorded on a computer readable recording medium. The computer readable recording medium includes a non-transitory computer readable medium and may be a magnetic recording apparatus, an optical disc, a magneto-optical recording medium, or a semiconductor memory. The program is distributed, for example, by selling, transferring, or lending a portable recording medium such as a Digital Versatile Disc (DVD) or a Compact Disc Read Only Memory (CD-ROM) on which the program is recorded. The program may also be distributed by storing the program in a storage of the server and transmitting the program from the server to another computer. The program may also be provided as a program product. The present disclosure may also be implemented as a program that can be executed by a processor.

The invention claimed is:

1. A control apparatus for controlling a vehicle, the control apparatus comprising a processor configured to:
when the processor determines that unloading of luggage is to be performed with respect to the vehicle, control the vehicle to set a geo-fence on at least a part of a region within a predetermined range from the vehicle, and
control the vehicle to adjust, in accordance with an attribute of the user or an attribute of the luggage, a display surface area of a size of the set geo-fence, the attribute of the user comprising a child and the attribute of the luggage comprising a luggage size of a first size, a second size, and a third size.

2. The control apparatus according to claim 1, wherein the processor is configured to control the vehicle to project visual information that includes at least one of: identification information for the vehicle, identification information for a user who boards or alights from the vehicle, and information indicating that boarding or alighting by the user or loading or the unloading of the luggage is to be performed.

3. The control apparatus according to claim 2, wherein the processor is configured to further notify a terminal existing in the geo-fence that the boarding or the alighting by the user or the loading or the unloading of the luggage is performed.

4. The control apparatus according to claim 2, wherein the processor is configured to further transmit the identification information for the vehicle to a user terminal of the user who is scheduled to board the vehicle.

5. The control apparatus according to claim 4, wherein the projected visual information and the identification information transmitted to the user terminal include common information.

6. The control apparatus according to claim 1, wherein the region within the predetermined range from the vehicle includes a region in an upward direction, a front direction, a side direction, or a rear direction from the vehicle.

7. A vehicle equipped with the control apparatus according to claim 1.

8. A non-transitory computer-readable medium storing a program configured to cause a computer, as a control apparatus for controlling a vehicle, to execute operations comprising:
upon determining that unloading of luggage is to be performed with respect to the vehicle, control the vehicle to set a geo-fence on at least a part of a region within a predetermined range from the vehicle, and
control the vehicle to adjust, in accordance with an attribute of the user or an attribute of the luggage, a display surface area of a size of the set geo-fence, the attribute of the user comprising a child and the attribute of the luggage comprising a luggage size of a first size, a second size, and a third size.

9. The non-transitory computer-readable medium according to claim 8, wherein the program is configured to cause the computer to further project visual information that includes at least one of: identification information for the vehicle, identification information for the user who boards or alights from the vehicle, and information indicating that boarding or alighting by the user or loading or the unloading of the luggage is to be performed.

10. The non-transitory computer-readable medium according to claim 9, wherein the program is configured to cause the computer to further notify a terminal existing in the geo-fence that the boarding or the alighting by the user or the loading or the unloading of the luggage is performed.

11. The non-transitory computer-readable medium according to claim 9, wherein the program is configured to cause the computer to further the transmit identification information for the vehicle to a user terminal of the user who is scheduled to board the vehicle.

12. The non-transitory computer-readable medium according to claim 11, wherein the projected visual information and the identification information transmitted to the user terminal include common information.

13. A control method performed by a control apparatus for controlling a vehicle, the control method comprising:
upon determining that unloading of luggage is to be performed with respect to the vehicle, controlling the vehicle to set a geo-fence on at least a part of a region within a predetermined range from the vehicle, and
controlling the vehicle to adjust, in accordance with an attribute of the user or an attribute of the luggage, a display surface area of a size of the set geo-fence, the attribute of the user comprising a child and the attribute of the luggage comprising a luggage size of a first size, a second size, and a third size.

14. The control method according to claim 13, wherein the control method further comprises projecting visual information that includes at least one of: identification information for the vehicle, identification information for a user who boards or alights from the vehicle, and information indicating that boarding or alighting by the user or loading or the unloading of the luggage is to be performed.

15. The control method according to claim 14, where the control method further comprises notifying a terminal existing in the geo-fence that the boarding or the alighting by the user or the loading or the unloading of the luggage is performed.

16. The control method according to claim 14, wherein the control method further comprises transmitting identification information for the vehicle to a user terminal of the user who is scheduled to board the vehicle.

17. The control method according to claim 16, wherein the projected visual information and the identification information transmitted to the user terminal include common information.

* * * * *